(12) United States Patent
Björklund et al.

(10) Patent No.: US 7,672,513 B2
(45) Date of Patent: Mar. 2, 2010

(54) METHODS, APPARATUS, COMPUTER PROGRAM AND STORAGE MEDIUM FOR POSITION DECODING

(75) Inventors: Andreas Björklund, Lund (SE); Tomas Edsö, Lund (SE)

(73) Assignee: Anoto AB (SE)

( * ) Notice: Subject to any disclaimer, the term of this patent is extended or adjusted under 35 U.S.C. 154(b) by 975 days.

(21) Appl. No.: 10/554,231

(22) PCT Filed: Apr. 29, 2004

(86) PCT No.: PCT/SE2004/000660

§ 371 (c)(1),
(2), (4) Date: Oct. 24, 2005

(87) PCT Pub. No.: WO2004/097723

PCT Pub. Date: Nov. 11, 2004

(65) Prior Publication Data

US 2006/0239505 A1     Oct. 26, 2006

Related U.S. Application Data

(60) Provisional application No. 60/466,036, filed on Apr. 29, 2003.

(30) Foreign Application Priority Data

Apr. 29, 2003    (SE)  .................................... 0301248

(51) Int. Cl.
    *G06K 9/00*     (2006.01)

(52) U.S. Cl. .................... 382/188; 382/181; 178/18.01; 345/103; 345/162

(58) Field of Classification Search ................. 382/188, 382/179, 181, 305, 173; 358/473, 406, 401, 358/402; 345/156, 157, 103, 104, 164, 165, 345/167, 173, 179, 162; 178/18.01, 18.09; 235/494

See application file for complete search history.

(56) References Cited

U.S. PATENT DOCUMENTS 4,606,069 A     8/1986    Johnsen (Continued)

FOREIGN PATENT DOCUMENTS

EP      0 469 868 A2     7/1991

(Continued)

OTHER PUBLICATIONS

Office Action mailed Mar. 22, 2005, in co-pending U.S. Appl. No. 10/282,001, now U.S. Patent No. 7,145,556 (5 pages).

(Continued)

*Primary Examiner*—Sheela C Chawan
(74) *Attorney, Agent, or Firm*—Finnegan, Henderson, Farabow, Garrett & Dunner LLP

(57) ABSTRACT

A method, in an apparatus for position decoding, operates to extract a sequence of positions from a sequence of images of a position-coding pattern, as recorded by a sensor. The method, which may be embodied as a computer program on a computer-readable storage medium, involves the steps of retrieving at least one reference position (P1, P1'); and extracting the sequence of positions solely by matching information obtained from each of the images with a corresponding pattern reference area (MA), which represents a known subset of the position-coding pattern with a given, direct or indirect, spatial relation to the reference position(s).

35 Claims, 11 Drawing Sheets

U.S. PATENT DOCUMENTS

| | | | |
|---|---|---|---|
| 4,817,171 A | 3/1989 | Stentiford |
| 4,998,010 A | 3/1991 | Chandler et al. |
| 5,221,833 A | 6/1993 | Hecht |
| 5,245,165 A | 9/1993 | Zhang |
| 5,442,147 A | 8/1995 | Burns et al. |
| 5,449,896 A | 9/1995 | Hecht et al. |
| 5,453,605 A | 9/1995 | Hecht et al. |
| 5,477,012 A | 12/1995 | Sekendur |
| 5,521,372 A | 5/1996 | Hecht et al. |
| 5,821,523 A | 10/1998 | Bunte et al. |
| 5,852,434 A | 12/1998 | Sekendur |
| 5,872,871 A | 2/1999 | Yokoyama et al. |
| 5,898,166 A | 4/1999 | Fukuda et al. |
| 5,937,110 A | 8/1999 | Petrie et al. |
| 5,973,110 A | 10/1999 | Muller et al. |
| 6,182,901 B1 | 2/2001 | Hecht et al. |
| 6,310,988 B1 | 10/2001 | Flores et al. |
| 6,548,768 B1 | 4/2003 | Pettersson et al. |
| 6,570,104 B1 | 5/2003 | Ericson et al. |
| 6,663,008 B1 | 12/2003 | Pettersson et al. |
| 6,667,695 B2 * | 12/2003 | Pettersson et al. ............ 341/5 |
| 6,674,427 B1 | 1/2004 | Pettersson et al. |
| 6,929,183 B2 | 8/2005 | Pettersson |
| 7,145,556 B2 | 12/2006 | Pettersson |
| 7,195,166 B2 | 3/2007 | Olsson et al. |
| 2002/0044138 A1 | 4/2002 | Edso et al. |
| 2003/0012455 A1 | 1/2003 | Olsson et al. |
| 2003/0056169 A1 | 3/2003 | Lapstun et al. |
| 2003/0128194 A1 | 7/2003 | Pettersson |
| 2004/0188526 A1 | 9/2004 | Olsson et al. |

FOREIGN PATENT DOCUMENTS

| | | |
|---|---|---|
| EP | 0 469 868 B1 | 3/1998 |
| WO | WO-92/17859 A1 | 10/1992 |
| WO | WO 00/73983 | 12/2000 |
| WO | WO-01/16691 A1 | 3/2001 |
| WO | WO 01/26032 | 4/2001 |
| WO | WO 01/26033 | 4/2001 |
| WO | WO 01/26034 | 4/2001 |
| WO | WO 01/30589 | 5/2001 |
| WO | WO 01/71653 | 9/2001 |
| WO | WO 01/75783 | 10/2001 |
| WO | SE02/01246 | 6/2002 |
| WO | WO-03/001441 A1 | 1/2003 |
| WO | SE 0103589-8 | 4/2003 |
| WO | SE02/01243 | 6/2003 |
| WO | SE 0104088-0 | 6/2003 |

OTHER PUBLICATIONS

Interview Summary dated Jun. 28, 2005, in co-pending U.S. Appl. No. 10/282,001, now U.S. Patent No. 7,145,556 (2 pages).

Office Action mailed Sep. 8, 2005, in co-pending U.S. Appl. No. 10/282,001, now U.S. Patent No. 7,145,556 (6 pages).

Office Action mailed Feb. 22, 2006, in co-pending U.S. Appl. No. 10/282,001, now U.S. Patent No. 7,145,556 (7 pages).

Office Action mailed Mar. 9, 2006, in co-pending U.S. Appl. No. 10/819,105, now U.S. Patent No. 7,195,166(7 pages).

Interview Summary dated May 19, 2006, in co-pending U.S. Appl. No. 10/282,001; now U.S. Patent No. 7,145,556 (1 page).

Notice of Allowance mailed Jun. 14, 2006, in co-pending U.S. Appl. No. 10/282,001, now U.S. Patent No. 7,145,556 (4 pages).

Interview Summary dated Jun. 29, 2006, in co-pending U.S. Appl. No. 10/819,105, now U.S. Patent No. 7,195,166 (2 pages).

Notice of Allowance mailed Oct. 6, 2006, in co-pending U.S. Appl. No. 10/819,105, now U.S. Patent No. 7,195,166 (6 pages).

* cited by examiner 1000  1020                                          1010

11010010000111 0111001010100001011              ----0110011010--
10000111011100 101010001011011001              ---0001001111101
010101000 1011011001101011 1100011              ---00001110111-0
111100011 0000001001111101 0010000              --0011111010010-
001111101 0010000111011100 1010100              -10-0001011011--
001100000 0100111110100100 0011101              -1001000011-01--
110111001 0101000101101100 1101011              1001-10100010---
010011111 0100100001110111 0010101              --10011111010---
000111011 1001010100010110 1100110
000110000 0010011111010010 0001110                    y-BOPM
010100010110110011010111100 01100
011000000 1001111101001 0000111011
100100001110111001010100 01011011
001011011001101011110001 10000001
001110111001010100010110 01101101
001011011001101011110001 10000001

Generated matching
area MA of position-
coding pattern

Fig 10

METHODS, APPARATUS, COMPUTER PROGRAM AND STORAGE MEDIUM FOR POSITION DECODING

CROSS-REFERENCE TO RELATED APPLICATIONS

The present application claims the benefit of Swedish patent application No. 0301248-1, filed on Apr. 29, 2003, and U.S. Provisional patent application No. 60/466,036, filed on Apr. 29, 2003, which both are hereby incorporated by reference.

FIELD OF THE INVENTION

The present invention generally relates to decoding of position-coding patterns, and, more specifically, to methods for position decoding, in which a sequence of positions is extracted from a sequence of images of a position-coding pattern, as recorded by a sensor.

The invention also relates to an apparatus, a computer program and a storage medium which can be used to decode a position-coding pattern.

BACKGROUND ART

Position-coding patterns are known which have the property that the absolute position in the position-coding pattern for a partial area of the position-coding pattern of a smallest predetermined size can be calculated by means of the information in the partial area and a predetermined algorithm. Examples of such position-coding patterns are disclosed in U.S. Pat. No. 5,477,012 (O. Sekendur), where each position is coded by means of a symbol, and WO 92/17859 (Hewlett Packard Co.), U.S. Pat. No. 6,570,104 (Anoto AB), U.S. Pat. No. 6,674,427 (Anoto AB), U.S. Pat. No. 6,667,695 (Anoto AB), US 2003/0012455 (Anoto AB) and U.S. Pat. No. 5,973,110 (Xerox Corp), where each position is coded by means of a plurality of symbols.

Position-coding patterns of this type can be used, for instance, for digital recording of information which is written and/or drawn by hand by means of a user unit on a base provided with the position-coding pattern. While moving the user unit, images of the position-coding pattern are continuously recorded locally at the tip of the user unit. One or more symbols in each of the images are decoded to a position. The decoded positions together constitute a digital description of the user unit's movement over the base.

The position-coding pattern in the recorded images can be decoded in different ways. For instance, aforesaid US 2003/0012455 discloses a decoding method which involves calculating probabilities that symbols which are identified in a recorded area of the position-coding pattern assume any of a plurality of different possible decoding values. These probabilities are stored as real (floating precision) numbers in probability matrices and are used together with the different possible decoding values for decoding the identified symbols into coordinates for positions in the position-coding pattern.

Aforesaid U.S. Pat. No. 6,674,427 and U.S. Pat. No. 6,667,695 disclose other ways of decoding or determining a position from a recorded image of a position-coding pattern.

The known position decoding methods may be regarded to have the common features that symbol data is extracted from an isolated image in a sequence of images to be decoded; that position data is derived by effecting one or more lookup operations, using the symbol data, in one or more data structures that contain fundamental coding data of the position-coding pattern; and/or that the symbol or position data is used as input data to a mathematical formula for explicit calculation of an absolute position.

Applicant's pending U.S. application Ser. No. 10/282,001, which was not yet publicly available at the date of filing of the present application, but later published as US 2003/0128194, discloses a method for position decoding, where a position for a recorded area of the position-coding pattern is calculated in a known manner, for instance in accordance with aforesaid US 2003/0012455. However, in case a decoding error is detected for said position, either for the position as a whole or for one of its coordinates, an additional operation is performed as "a last resort"; information determined from the recorded area is compared or matched with information about how the position-coding pattern is composed in a matching area around a successfully decoded nearby position. The best matching portion of the known matching area is selected, and a corresponding position is determined as the decoded position. Thus, in summary, US 2003/0128194 discloses mandatory use of decoding by calculation of position from recorded area, followed, in case of a decoding failure, by an additional matching operation.

SUMMARY OF THE INVENTION

An object of the invention is to provide an alternative to known methods of position decoding from recorded images of a position-coding pattern.

More specifically, an object of the invention is to allow fast, efficient and yet robust decoding of a position-coding pattern.

Generally, the objects of the invention are at least partly achieved by means of methods, an apparatus, a computer program and a storage medium according to the independent claims, preferred embodiments being defined by the dependent claims.

A first aspect of the invention is a method for position decoding, in which a sequence of positions is extracted from a sequence of images of a position-coding pattern, as recorded by a sensor. The method comprises the steps of: retrieving at least one reference position; and extracting said sequence of positions solely by matching information obtained from each of said images with a corresponding pattern reference area, which represents a known subset of the position-coding pattern with a given spatial relation to said reference position.

That said sequence of positions is extracted solely by matching information from each of said images with said corresponding pattern reference area means that the method is not based on any preceding step in which an attempt is made to calculate the positions in another way than through aforesaid extracting by matching.

Each position in said sequence of positions may be extracted by: determining a relative location, within said pattern reference area, of a match between said information and said pattern reference area; and adjusting said spatial relation by said relative location to thereby derive said position. Thus, the sequence of positions may be extracted in a fast and efficient way.

The pattern reference area, which represents the known subset of the position-coding pattern, may be generated for each image to be decoded. Alternatively, the pattern reference area may be generated only intermittently, to thus be used in the decoding of several consecutive images in the sequence of images.

The given spatial relation of the pattern reference area to said at least one reference position may be either direct, in that the spatial location of each pattern reference area is directly defined or calculated from the reference position(s), or indirect, in that the spatial location is defined or calculated from one or more preceding positions, which are preceding in the sense that they have been extracted by preceding steps of matching. Each such preceding position again has a defined spatial location, directly or indirectly, with respect to the reference position(s).

The spatial relation may be given by a predicted position which is estimated based on said at least one reference position, and by said pattern reference area being generated with a given positional relationship to said predicted position. Preferably, the predicted position is included in the known subset of the position-coding pattern as represented by the pattern reference area. Thereby, the matching may be effected around the predicted position.

The step of estimating the predicted position may be effected for each image, to generate a sequence of predicted positions, which in turn may be converted, by said step of extracting by matching, to said sequence of positions. The conversion may be effected for a group of predicted positions, or sequentially by each predicted position being converted by matching to a decoded position before estimating a subsequent predicted position.

Each predicted position may be estimated based on at least two preceding positions selected from said at least one reference position and/or said sequence of positions. Moreover, each predicted position may be estimated by polynomial, such as linear, extrapolation of said at least two preceding positions.

The reference position may be retrieved by calculating a position based on an image of said position-coding pattern in accordance with a prior art method of position decoding or calculation. Such a calculation may typically include: extracting symbol data from an isolated image preceding said sequence of images; deriving position data by effecting one or more lookup operations, using said symbol data, in one or more data structures that contain fundamental coding data of the position-coding pattern; and/or inputting said symbol or position data to a mathematical formula for explicit calculation of an absolute position.

The step of retrieving may be effected intermittently to update or replace said at least one reference position, the thus-retrieved reference position(s) being used in a subsequent step of extracting by matching for a subsequent sequence of images. The retrieval may be effected at a fixed sampling interval, or whenever a need for, or opportunity of, such retrieval is detected. In digitizing the movement of a writing implement on a position-coded base, a single handwriting stroke may be represented by several consecutive sequences of positions, each being extracted by matching. The method may suitably comprise the step of merging said at least one reference position with said sequence(s) of positions, so as to form a true representation of the movement.

In one embodiment, the corresponding pattern reference area for an individual image among said sequence of images includes a plurality of partial areas defining a plurality of respective candidates to a position represented by the position-coding pattern in said individual image. In this embodiment, the step of extracting by matching may include comparing the information obtained from said individual image with each of said plurality of partial areas included in the corresponding pattern reference area. The step of extracting may further include selecting the candidate for which the comparing step indicates correspondence between the information obtained from said individual image and any of said plurality of partial areas.

The method described above for position decoding can advantageously be used together with any of the position-coding patterns that have been developed by Anoto AB and are described in for instance U.S. Pat. No. 6,674,427 or U.S. Pat. No. 6,667,695. Thus, the position-coding pattern may comprise a plurality of marks, wherein each mark codes one of at least two different values in at least one dimension.

In one embodiment, which is adapted for use with a position-coding pattern of the above type, the step of extracting by matching includes obtaining said information from an individual image among said sequence of images by generating a probability matrix, said probability matrix representing a subarea of the position-coding pattern which is included in said individual image and containing one matrix element for each mark in said subarea, wherein each matrix element is adapted to store either a value which represents a most probable estimated value of its mark, or a value which represents that no value has been estimated for its mark. The value which represents a most probable estimated value is preferably an integer value. Using integer, e.g. binary, values in the probability matrix allows fast and efficient matching with the pattern reference area, since matrix operations performed on integers are faster to perform than for, e.g., real numbers.

For a position-coding pattern of the above type, where each mark codes a binary value in a first dimension and a binary value in a second dimension, a first probability matrix may be generated for the values of the marks in said first dimension and a second probability matrix may be generated for the values of the marks in said second dimension.

In one embodiment, said step of extracting by matching includes comparing the or each probability matrix with each of said plurality of partial areas included in the corresponding pattern reference area. This may be done by bit-wise correlation between the one-dimensional contents of the probability matrix and the contents, in the same dimension, of each equally sized partial area.

Another embodiment is particularly adapted for use with a position-coding pattern, each dimension of which is based on shifts of a cyclic main number sequence, wherein any subsequence, of a first predetermined length or longer, of said cyclic main number sequence has an unambiguously determined position in said cyclic main number sequence, and based on a sequence of difference numbers representing differences in shifts between pairs of said main number sequence in the position-coding pattern, wherein any subsequence, of a second predetermined length or longer, of said difference number sequence has an unambiguously determined position in said difference number sequence. This pattern may be of the type referred to above. In this embodiment, the step of extracting by matching includes: obtaining a first set of difference numbers for said pattern reference area; obtaining a second set of difference numbers from the or each probability matrix; matching said second set of difference numbers with said first set of difference numbers; and extracting a position of said position-coding pattern, in said dimension, from a match from said matching step.

The second set of difference numbers may be obtained by matching respective rows or columns of the or each probability matrix with said main number sequence so as to estimate main number sequence positions for said rows or columns, and deriving the difference numbers of said second set of difference numbers by subtracting estimated main number sequence positions for pairs of rows or columns of the or each probability matrix.

A second aspect of the invention is a method for position decoding by determining a position on the basis of information obtained from a partial area, recorded by a sensor, of a position-coding pattern, the position-coding pattern comprising a plurality of marks, each mark coding one of at least two different values in at least one dimension. This method includes the steps of: generating a probability matrix, said probability matrix containing one matrix element for each mark in said partial area, each matrix element being adapted to store either a value which represents a most probable estimated value of its mark, or a value which represents that no value has been estimated for its mark; matching said probability matrix with information about how the position-coding pattern is composed in a pattern reference area of said position-coding pattern, said pattern reference area being larger than said partial area and including said partial area; and selecting, as the position to be determined, the one of the positions defined by said pattern reference area for which the matching step indicates correspondence between said probability matrix and said matching area.

The methods described above can be accomplished in hardware or software. Thus, a third aspect of the invention is a computer program, which comprises program code that, when executed in a computer, causes the computer to carry out a method according to the first or second aspect.

The computer program can be executed by a processor which is arranged in the same unit as the sensor that images the partial area, for which a position is to be decoded, or in another unit.

The computer program can be stored and distributed in the form of a storage medium, such as an electronic memory like RAM, SRAM, DRAM, SDRAM, ROM, PROM, EPROM, EEPROM, etc; an optical disk; a magnetic disk or tape; or some other commercially available storage medium. The storage medium can also be a propagating signal.

According to a fourth aspect, the invention concerns an apparatus which comprises a signal-processing unit, which is adapted to perform a method according to the first or second aspect.

The signal-processing unit may e.g. be realized by a suitably programmed processor, by specifically adapted hardware, such as an ASIC (Application-Specific Integrated Circuit) or an FPGA (Field Programmable Gate Array), by digital or analog circuits or any combination thereof.

Other objects, features and advantages of the invention are apparent from the following detailed description of the invention, from the appended claims and from the drawings.

Of course, features of the different embodiments of the invention may be combined in one and the same embodiment.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated otherwise.

BRIEF DESCRIPTION OF THE DRAWINGS

The invention will now be described in more detail with reference to the accompanying drawings.

FIG. 10 shows a generated local position-coding pattern and a binary offset probability matrix to illustrate the operating principle of the first embodiment.

DETAILED DESCRIPTION OF THE INVENTION

Figure 1:
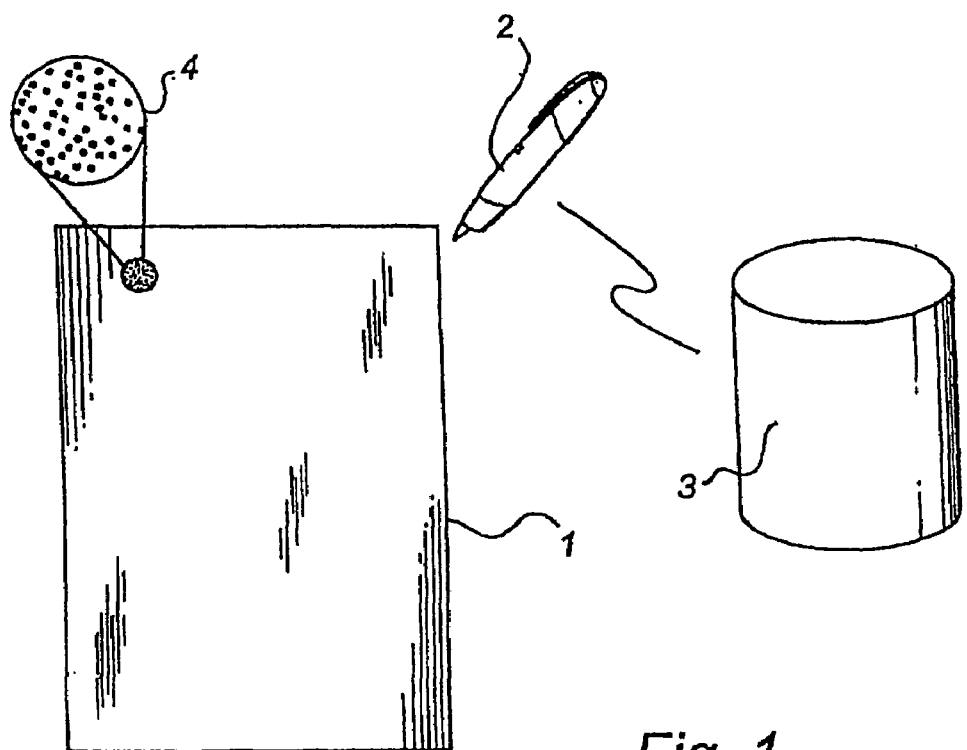
FIG. 1 is a schematic view of a system in which the invention can be used.

FIG. 1 shows a system for information management, in which the present invention can be used. The system comprises a base 1 in the form of a sheet of paper, a user unit 2 and an external unit 3. The sheet of paper is provided with a position-coding pattern, only a small part 4 of which is schematically indicated in an enlarged scale. The user unit 2 can be used to write on the sheet of paper 1 in the same way as with an ordinary pen and to simultaneously record what is being written in digital form. The digitally recorded information can be processed in the user unit 2 and/or the external unit 3, to which it can be sent automatically (on-line) or when commanded by the user. For the digitally recorded information to correctly reflect the information on the sheet of paper, it is important that the position decoding be made as correctly and completely as possible.

The position-coding pattern, which will be described in more detail below, is made up of graphical symbols, which are arranged or designed according to predetermined rules. This means that if a partial area of the position-coding pattern is correctly imaged, said partial area having a predetermined minimum size, the position of the partial area in the position-coding pattern can be determined unambiguously by means of one or more symbols in the imaged partial area and a predetermined decoding algorithm. The position can be obtained as a pair of coordinates in a Cartesian or another coordinate system.

When a user writes by means of the user unit 2 on the sheet of paper 1, the user unit will continuously record images of a partial area of the position-coding pattern at the tip of the user unit. Each image is decoded to a position. A sequence of such decoded positions then constitutes a digital representation of the movement of the user unit 2 over the sheet of paper and, thus, of what is written on the sheet of paper.

The decoding of the position-coding pattern can take place in the user unit 2, in the external unit 3 or in some other unit to which the images of the position-coding pattern are sent in a more or less processed form.

As mentioned above, the information in the partial area is decoded by means of a predetermined decoding algorithm.

This functions well as long as the partial area is correctly imaged. Under actual conditions, however, the user unit often cannot image the partial area entirely correctly, for instance because of poor lighting conditions, or when user holds the pen in an inclined position which causes the partial area to be imaged in perspective, or if the recorded image is deformed by the imaging mechanism or by other disturbances such as signal noise. It may happen that the decoding algorithm misinterprets a symbol or misses a symbol, thereby making it harder to decode the position correctly. Errors can also arise if the position-coding pattern is not quite accurately reproduced on the sheet of paper but has been deformed to some extent when being applied to the sheet of paper. Under certain conditions, errors can be discovered, for example, if the position-coding pattern contains redundant information which enables error detection or if the decoded position is unreasonable in relation to previously or subsequently decoded positions.

Figure 2:
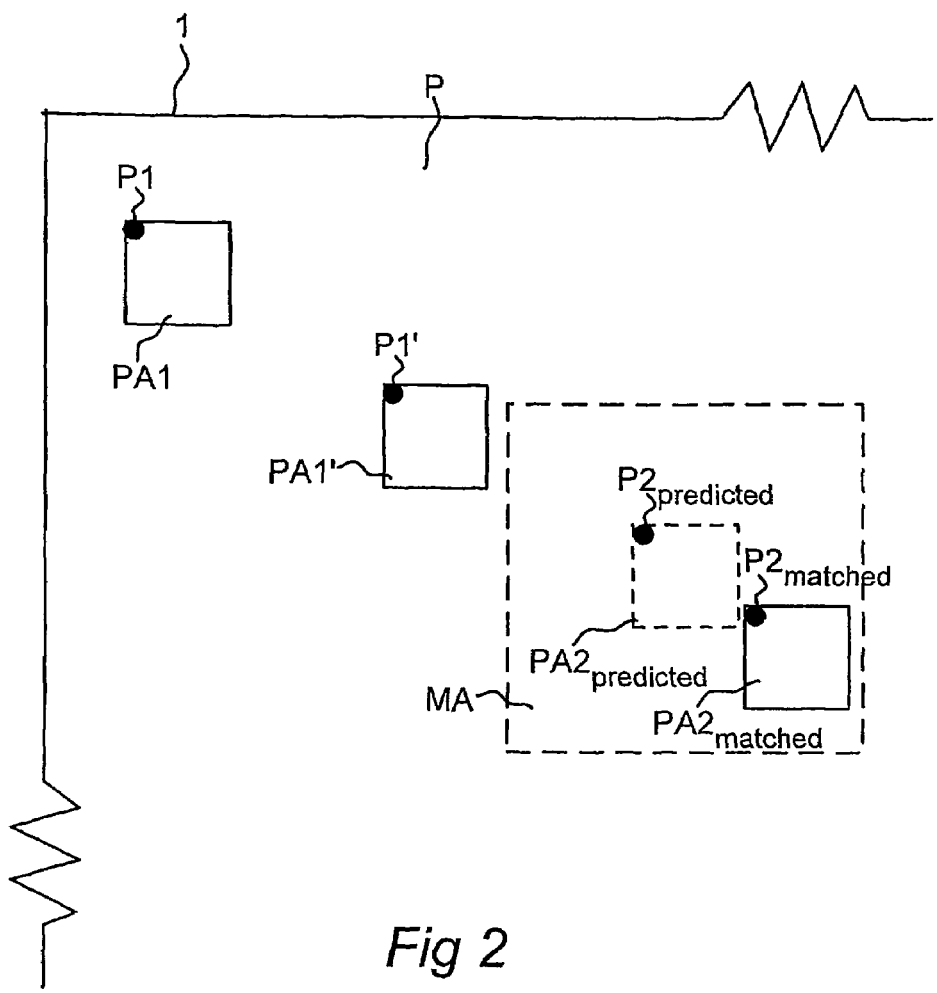
FIG. 2 is a schematic illustration of decoding and matching of partial areas of a position-coding pattern.
Figure 3:
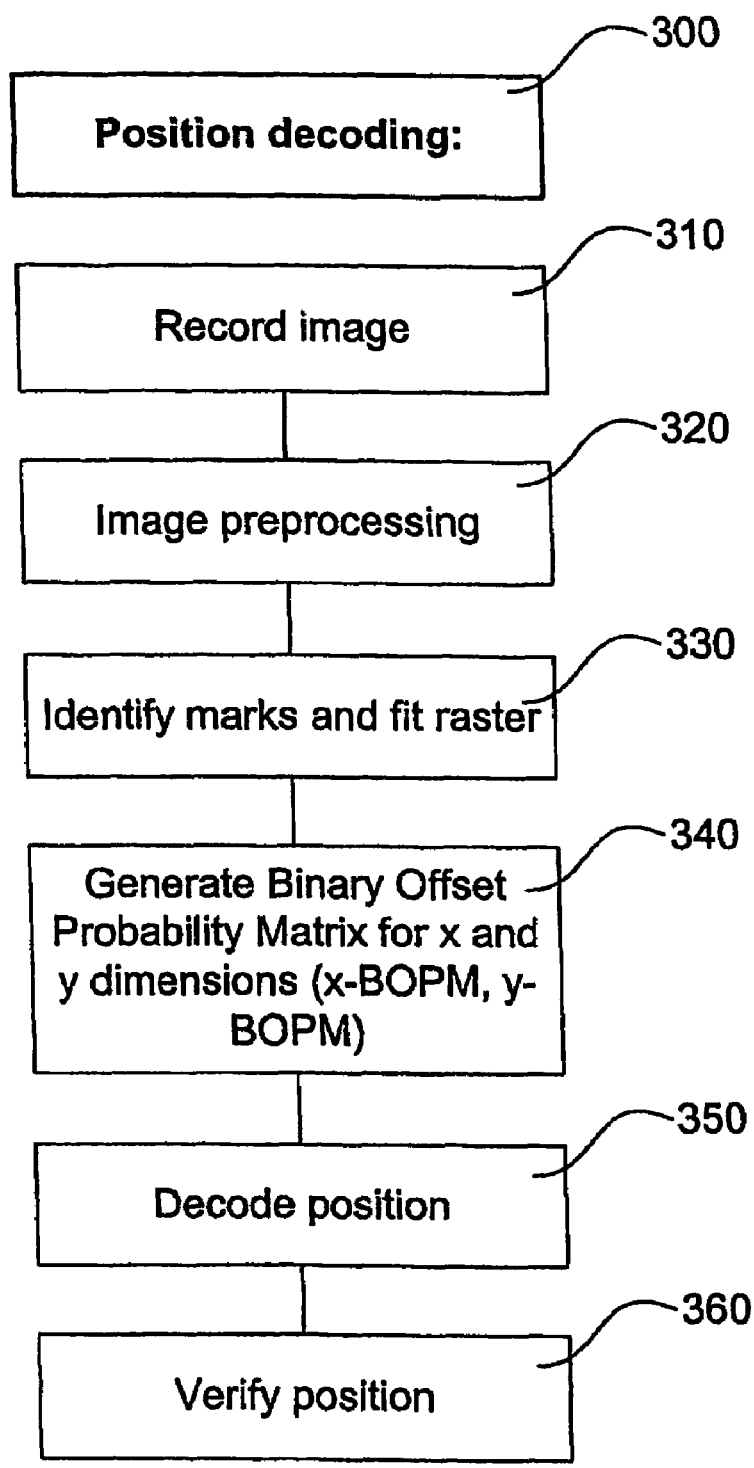
FIG. 3 is a flow chart that illustrates a general method according to the invention of determining a position by decoding an image of a partial area of a position-coding pattern.

FIGS. 2 and 3 illustrate a general method according to the invention of determining a position by decoding an image of a partial area of a position-coding pattern. This method allows for fast, efficient and reliable decoding even if it has not been possible to successfully record and interpret all symbols within the partial area of the position-coding pattern. A sheet of paper 1 is provided with a position-coding pattern P, which for the sake of clarity is not shown in FIG. 2. A small portion of the position-coding pattern P is however shown at 20 in FIG. 4. As will be explained in more detail in the following, the position-coding pattern comprises a plurality of marks 22 which partly constitute the code symbols of the pattern.

As seen in FIG. 2, two partial areas PA1 and PA1' of the position-coding pattern P code positions P1 and P1', respectively. It is assumed in FIG. 2 that positions P1 and P1' have been successfully decoded from recorded images of partial areas PA1 and PA1' by way of any applicable decoding method. Next, in step 310 of FIG. 3 an image of a new partial area PA2 (not explicitly shown in FIG. 2) is recorded, for which it is desired to decode a corresponding position P2. The recorded image is preprocessed in a step 320 so as to form a suitable input for a following step 330, in which marks 22 are identified and a virtual raster 21 is fit to the marks. Steps 320 and 330 may be performed by way of techniques that are well known in the art, such as filtering, binarization or thresholding, and utilization of the distance between different pairs of dots or utilization of Fourier transforms, as is described for instance in U.S. Pat. No. 6,548,768 and US 2002/0044138.

Following steps 320 and 330, the actual decoding occurs in steps 340 and 350. First, a pair of matrices, referred to as x-BOPM and y-BOPM in the following, are generated by estimating the values represented by the marks 22 of the partial area PA2 in x and y dimensions. The information kept by these matrices will then be used for matching with information about how the position-coding pattern P is composed in a matching area MA. The information in the matching area MA may be generated exclusively for the decoding of only one position by matching. As seen in FIG. 2 and as will be described in more detail later, the matching area MA is larger than the partial area PA2 and has a given positional relation to a prediction $PA2_{predicted}$ of the partial area PA2. The prediction $PA2_{predicted}$ corresponds to a predicted position $P2_{predicted}$ which is determined from the positions P1 and P1' of the previously decoded partial areas PA1 and PA1'. Positions P1 and P1' are thus examples of the "at least one reference position" referred to in the Summary section of this document, and the matching area MA is an example of the "pattern reference area".

The size of the matching area MA may be set to a constant value which reflects a normal or default handwriting speed. For instance, the matching area MA may contain 32×32 code symbols. Alternatively, the size of the matching area MA may be adjusted dynamically depending on appropriate input data, such as current handwriting speed. The size of the partial area PA2 may be chosen in view of the size of the matching area MA and also depending on the size of the recorded images. The partial area PA2 need not occupy the entire part of an recorded image. The partial area need not even have the above-discussed minimum size for unambiguous position determination. Generally speaking, the robustness of the decoding process increases with increasing size of the partial area, whereas the speed and the efficiency of the decoding process increase with decreasing size of the partial area. At present, a size of 16×16 code symbols is used for the partial area PA2.

The result of steps 340 and 350 may be the partial area $PA2_{matched}$ that best matches an equally sized subarea of the matching area MA, and the relative location of $PA2_{matched}$ with respect to the matching area MA and, thus, with respect to the predicted position $P2_{predicted}$. Hence, a position $P2_{matched}$ defined by the resulting partial area $PA2_{matched}$ may be determined by simply adding this relative location to the predicted position $P2_{predicted}$. As seen in FIG. 2, while in practice the predicted partial area $PA2_{predicted}$ will not exactly correspond to the recorded partial area PA2, the matched partial area $PA2_{matched}$ will. Thus, the result of the decoding method will be the position $P2_{matched}$ which is identical to the position P2 sought for. The determined position may be verified in a step 360.

A brief description of an apparatus—in the form of an electronic pen—in which the position decoding according to the invention may be carried out will now be given with reference to FIGS. 6 and 7.

Figure 6:
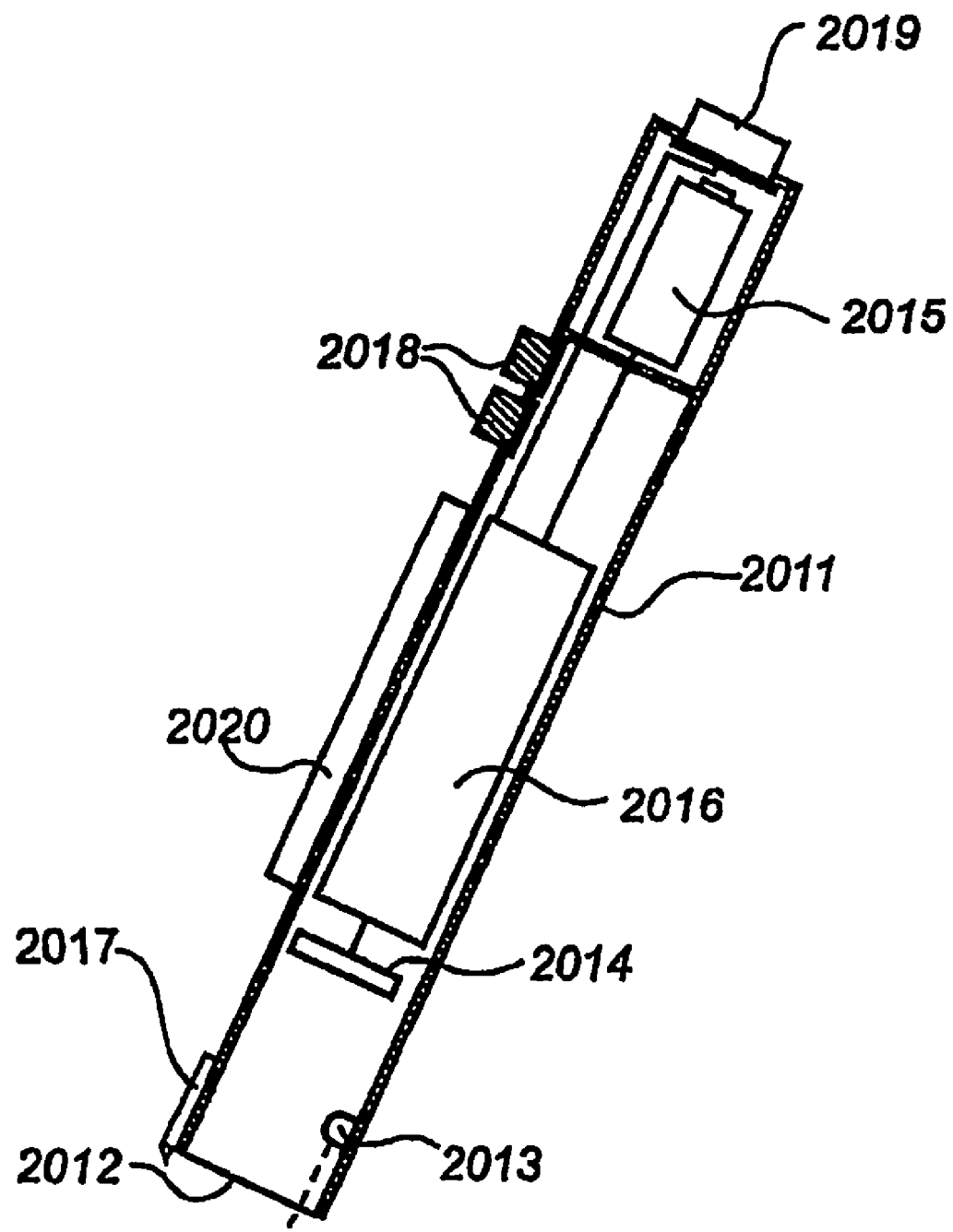
FIG. 6 is a schematic illustration of an apparatus, in the form of an electronic pen, in which the position decoding according to the invention may be carried out.
Figure 7:
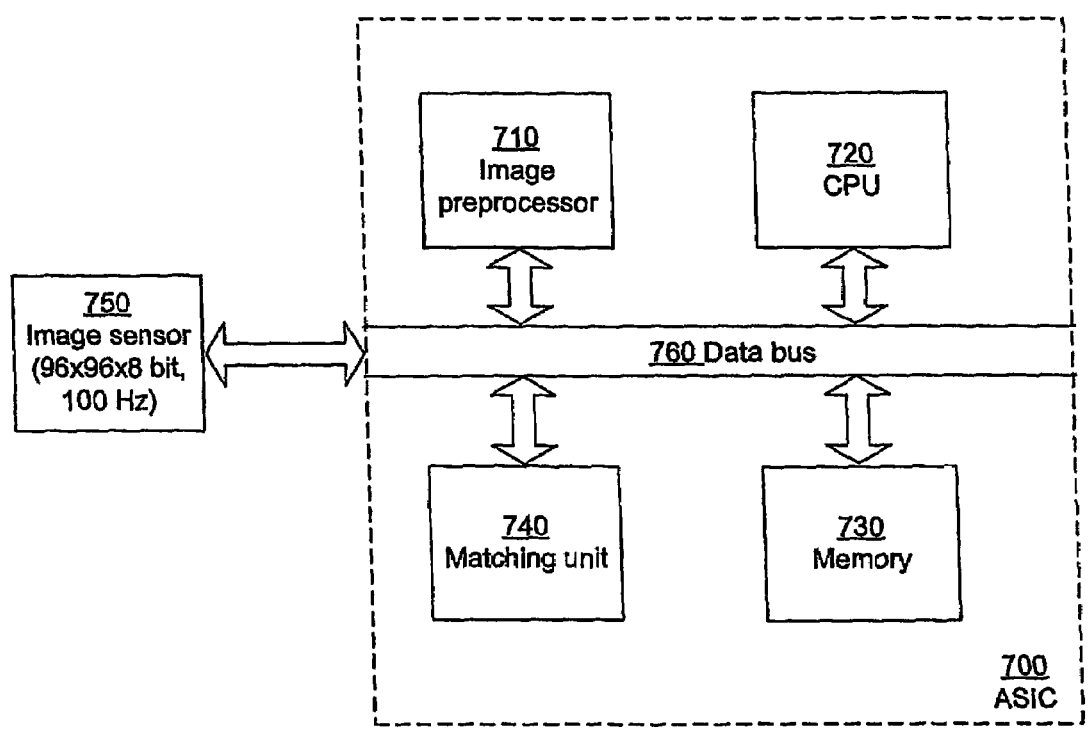
FIG. 7 is a schematic block diagram of an electronic circuitry part and an image sensor in the device shown in FIG. 6.

The apparatus of FIGS. 6 and 7 can constitute the user unit 2 in FIG. 1. It comprises a casing 2011 having approximately the same shape as a pen. In one short side of the casing there is an opening 2012. The short side is intended to abut against or be placed a short distance from the surface on which the position determination is to take place.

The casing essentially contains an optics part, an electronic circuitry part, and a power supply.

The optics part comprises a light-emitting diode 2013 for illuminating the surface which is to be imaged and a light-sensitive area sensor 2014, such as a CCD (Charge Coupled Device) or CMOS (Complementary Metal-Oxide Semiconductor) sensor, for recording a two-dimensional image. The apparatus may also comprise an optical system, such as a mirror and/or lens system. The light-emitting diode can be an infrared light-emitting diode and the sensor can be sensitive to infrared light.

Generally speaking, the image sensor 2014 may be replaced by any kind of sensor that is suitable for imaging the position-coding pattern so that an image of the marks is obtained in black and white, in grey scale or in color. Such a sensor can be a solid-state single- or multi-chip device which is sensitive to electromagnetic radiation in any suitable wavelength range. For example, the sensor may include a CCD element, a CMOS element, or a CID element (Charge Injection Device). Alternatively, the sensor may include a magnetic sensor array for detection of a magnetic property of the marks. Still further, the sensor may be designed to form an image of any chemical, acoustic, capacitive or inductive property of the marks.

The power supply to the apparatus is obtained from a battery 2015 which is mounted in a separate compartment in the casing. The power supply can also be obtained via a cable from an external power source (not shown).

The electronic circuitry part 2016 comprises a processor unit with a processor which may be programmed to read images from the sensor and carry out position calculation, matching and verification on the basis of these images, as well as a working memory and a program memory.

Furthermore, in the shown embodiment, the apparatus comprises a pen point 2017, by way of which it is possible to write ordinary pigment-based ink on the surface upon which the position determination is to be carried out. The pen point 2017 can be extendable and retractable, so that the user can control whether or not it is to be used. In certain applications, the apparatus need not have a pen point at all.

Suitably, the pigment-based ink is of a type that is transparent to infrared light, while the marks absorb infrared light. By using a light-emitting diode which emits infrared light and a sensor which is sensitive to infrared light, the detection of the pattern takes place without any interference between the above-mentioned writing and the position-coding pattern.

Moreover, the apparatus may comprise buttons 2018 by means of which the user will activate and control the apparatus. It also comprises a transceiver 2019 for wired or wireless transmission, e.g. using cable, IR light, radio waves or ultrasound, of information to and from the apparatus. The apparatus can also comprise a display 2020 for showing positions, recorded information or other information to the user.

The apparatus can be divided into different physical casings. The sensor and other components that are necessary for capturing images of the position-coding pattern and for transmitting them may be located in a first casing, while the signal-processing unit and the other components that are necessary for carrying out the position decoding may be located in a second casing.

FIG. 7 is a schematic block diagram of the electronic circuitry part 2016 and the image sensor 2014 in the apparatus shown in FIG. 6. An ASIC 700 implements the electronic circuitry part 2016 and contains a CPU 720 as a main controller of the electronic circuitry. The CPU 720 has access to a memory 730 through an on-chip data bus 760. The image sensor 2014 is implemented as a CMOS area sensor 750, which is connected to the data bus 760 of ASIC 700 and which is capable of producing 96×96-pixel, 256-level grayscale digital images at a frequency of about 100 Hz. An image preprocessor 710 on ASIC 700 will operate on images received from the image sensor 750 in accordance with step 320 of FIG. 3 and store the preprocessed images in memory 730. The CPU 720 will generate the x-BOPM and y-BOPM matrices and will also perform the decoding of partial areas into positions. A matching unit 740 may assist the CPU 720 in these tasks. In an alternative embodiment, the ASIC 700 may be designed to operate without intermediate storage of the preprocessed images.

In the following, the position decoding will be exemplified and described in more detail with reference to a specific position-coding pattern which has been developed by the applicant and which is thoroughly described in, inter alia, U.S. Pat. No. 6,667,695. Position-coding patterns of similar types are described in detail in WO 01/16691, U.S. Pat. No. 6,663,008 and U.S. Pat. No. 6,674,427. An alternative position-coding pattern is shown in U.S. Pat. No. 6,570,104.

The position coding is based on a number sequence which below is referred to as difference number sequence. This difference number sequence has the property that if one takes an arbitrary partial sequence of a predetermined length, for instance a partial sequence with five difference numbers, this partial sequence always has an unambiguously determined location in the difference number sequence. In other words, it appears only once in the difference number sequence and can thus be used for position determination. More specifically, the difference number sequence "runs" along the x axis as well as along the y axis of the position-coding pattern.

Figure 5:
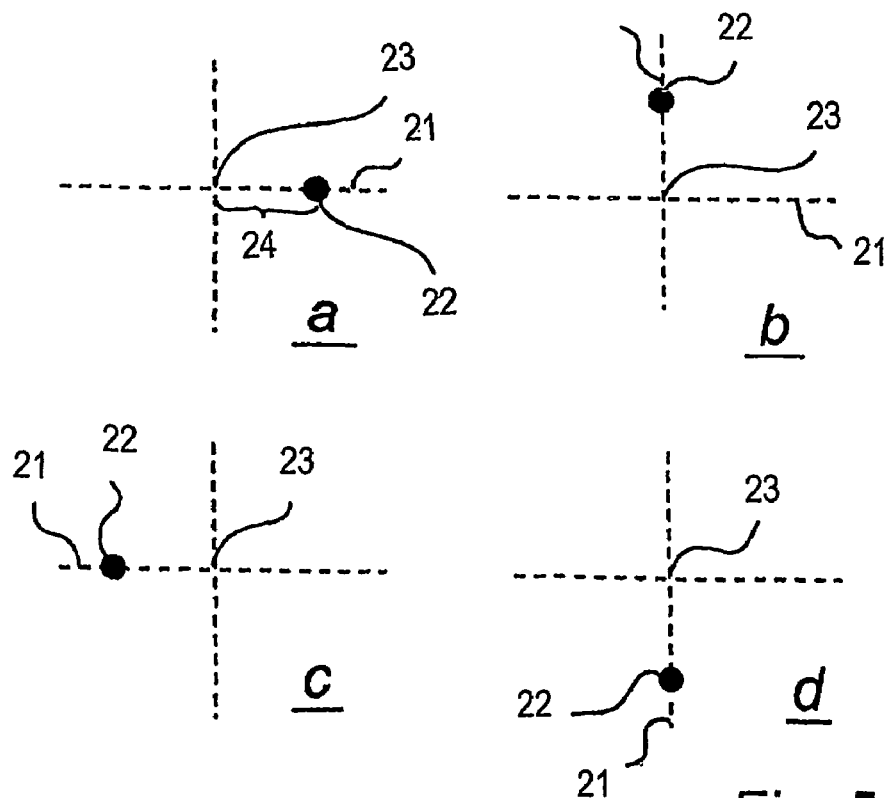
FIG. 5 shows four ideal locations of a mark in a position-coding pattern.
Figure 4:
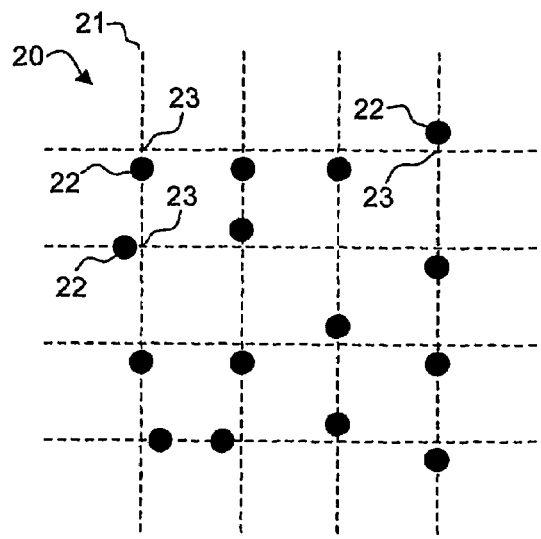
FIG. 4 is a schematic illustration of a position-coding pattern which may be decoded according to the present invention.

The actual position-coding pattern is made up of simple graphical symbols 22 which can assume four different values, 0-3. As seen in FIGS. 4 and 5, each symbol 22 contains a mark which, for instance, can have the shape of a dot and which can be displaced a distance 24 in one of four different directions relative to a nominal position 23 or raster point. The nominal position 23 is at an intersection between raster lines 21 in a grid that may be virtual, i.e. invisible to the area sensor in the pen, or actual, by the raster lines being wholly or partly visible to the area sensor. The value of the symbol is determined by the direction of the displacement. Each symbol value 0-3 can be converted into one bit which is used for coding an x coordinate and one bit which is used for coding a y coordinate, i.e. into the pairs of bits (0,0), (0,1), (1,0), and (1,1). Thus, the coding is made separately in the x direction and the y direction, but the graphical coding is made with a symbol which is common to the x and y bits.

The distance 24 is suitably not less than about ⅛ and not more than about ¼, preferably about ⅙, of the distance between two adjacent raster lines 21. The distance can, for example, be about 300 micrometers or about 254 micrometers. The latter distance is particularly suitable for printers and scanners, which often have a resolution that is a multiple of 100 dpi (dots per inch).

Each position is coded by 6*6 symbols which can thus be converted into a 6*6 bit matrix for an x coordinate and a 6*6 bit matrix for a y coordinate for the position. If the x bit matrix is considered, this can be divided into six columns of six bits each. Each sequence of bits in a column constitutes a partial sequence in a 63-bit-long cyclic main number sequence which has the property that if a partial sequence having a length of six bits is selected, this has an unambiguously determined place in the main number sequence. The six columns can thus be converted into six position numbers or sequence values which correspond to six places in the main number sequence. Between these six position numbers, five difference numbers can be formed in pairs, which constitute a partial sequence of the difference number sequence and which thus have an unambiguously determined place in the same and, consequently, an unambiguously determined place along the x axis. For a certain x coordinate, the position numbers will vary depending on the y coordinate. On the other hand, the difference numbers will be the same independently of the y coordinate, since the position numbers always vary according to the main number sequence, which is repeated cyclically in the columns in the entire position-coding pattern.

Correspondingly, six rows in the y bit matrix define six position numbers in the main number sequence. These six position numbers define five difference numbers, which constitute a partial sequence of the difference number sequence and which thus have an unambiguously determined place along the y axis.

When the position-coding pattern is used, images of different parts of the position-coding pattern are recorded, as has been described above. As a rule, the images contain considerably more than 6*6 symbols. Thus, the decoding may be based on the best n*m symbols in the image, with n and m being any number of symbols equal to 6 or larger. For example, the decoding may be based on the best 8*8 or 16*16 symbols. The extra symbols are used, inter alia, for error detection and/or correction.

In the following, position decoding based on the above-described position-coding pattern will be described with reference to the drawings. The position decoding is preferably carried out by means of a processor and suitable program code which can be available in the user unit 2 or the external unit 3 in FIG. 1 or in some other unit.

Since the position-coding pattern is not always perfectly reproduced on a surface and since the user unit sometimes deforms the position-coding pattern during imaging, it may be difficult to determine quite safely the displacements of the dots and, thus, the value of the symbols. Instead, for each symbol the probability that the symbol assumes any of the four different possible values may be determined. According to embodiments of the present invention, aforesaid two matrices are generated in step 340 of FIG. 3 for an imaged partial area PA—one for columns (x coordinate encoding) and one for rows (y coordinate encoding). Each matrix element in each of these two matrices may contain an integer value that represents the estimated binary value of the symbol in the x direction and y direction, respectively. This is in contrast to the prior art, e.g. aforesaid US 2003/0012455, where each matrix element contained two real numbers (floating-precision numbers) representing the probability of the symbol value "0" and "1", respectively. These two matrices may be referred to as Binary Offset Probability Matrices (BOPM) and are identified as "x-BOPM" and "y-BOPM" in the drawings.

In addition, each matrix element in the x-BOPM and y-BOPM matrices may indicate that no binary value was estimated for the symbol, e.g. because it was not possible, at some level of certainty, to decide which of the four possible displaced positions (FIG. 5) that the mark 22 in question assumes.

Thus, each matrix element in the x-BOPM and y-BOPM matrices will contain any of the values "0", "1" or "-", the latter representing that no binary value was estimated for the symbol.

Various methods may be employed when analyzing a recorded and preprocessed image so as to estimate, if possible, the binary values of the symbol in the x and y directions—as given by the displacement of the mark 22—and otherwise represent the symbol by the uncertainty value "-".

For instance, for each identified mark it may be investigated whether it lies within a certain "safe" zone around any of the four ideal displacement positions shown in FIG. 5. Such "safe" zones may e.g. be defined by circular areas having their centers at respective ones of the four ideal displacement positions and having a predefined radius. Thus, if a mark is found to lie within any such "safe" zone, the symbol is held to have the value represented by the ideal displacement position that forms the center of the "safe" zone.

Alternatively, "full-scale", real-number probability matrices may be calculated based on a distance function that outputs a real-number probability value based on the displacement of a mark from an ideal displacement position. Examples of such calculations are given in aforesaid US 2003/0012455. Then, probability threshold values may be applied to the real-number probability matrices, such that if for instance such a probability matrix indicates that a certain mark encodes a "0" or a "1" at a probability in excess of 0.8, where 0.8 is the threshold, then the corresponding matrix element in the x-BOPM or y-BOPM matrix will be set to "0" or "1"; otherwise the matrix element will be set to "-".

As still an alternative, if the encoding of the marks is such that the same x value (y value) is used for the two ideal positions that lie above a diagonal line through the raster point 23 (e.g. positions b and c in FIG. 5) as well as for the other two that lie below such a diagonal line (e.g. positions a and d in FIG. 5), the location of an identified mark and its distance to such a diagonal line may be used to estimate the binary values of the symbol in question.

The x-BOPM and y-BOPM matrices thus produced are used in step 350 of FIG. 3 in two different ways, according to the disclosed embodiments, so as to decode the position coded by the pattern in the partial area PA of the recorded image.

Figure 8:
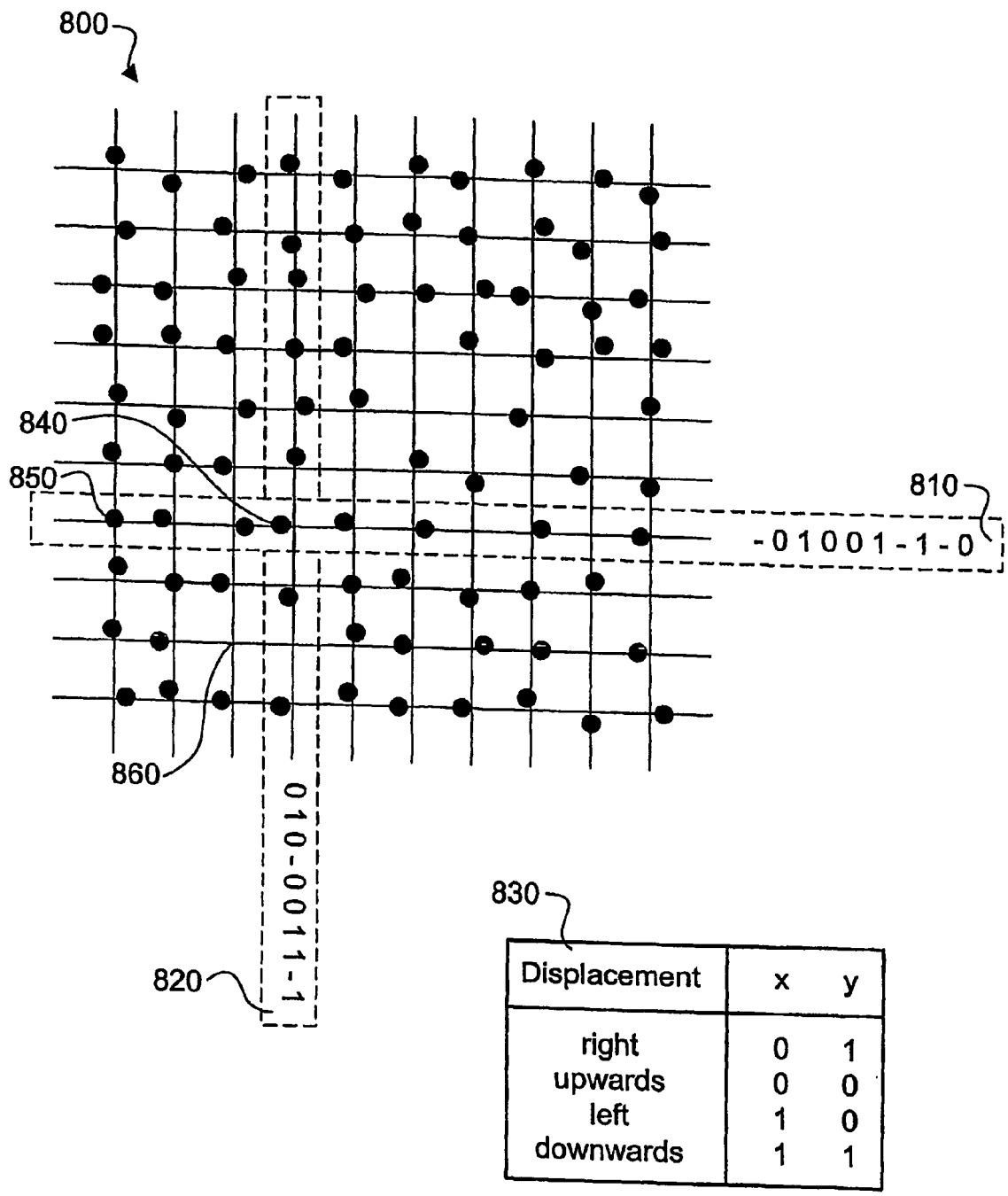
FIG. 8 is a schematic illustration that demonstrates the way in which a binary offset probability matrix is generated.

In a first embodiment, which will be described with reference to FIGS. 8-10, a method referred to as Pattern Neighborhood Matching (PNM) is used for matching a recorded partial area PA (as represented by the x-BOPM and y-BOPM matrices) with a larger matching area MA of the position-coding pattern, generated around a predicted position in the position-coding pattern. The predicted position is produced from preceding positions defined by preceding partial areas of the position-coding pattern. Here, a complete bit-wise correlation between the recorded partial area PA and the generated matching area MA is performed. Thus, this method will be capable of successful decoding also if the recorded partial area PA contains several uncertain or incorrectly estimated symbols.

A second embodiment, which will be described with reference to FIG. 11-13, concerns a method referred to as Pattern Sequence Matching (PSM). Here, no full bitwise correlation between recorded partial area PA and matching area MA is performed. Instead, matching is made between difference subsequences found in the recorded partial area PA and difference subsequences for a larger matching area MA, which again is generated around a predicted position in the position-coding pattern. This method will be faster, since the number of matches performed is smaller than for the PNM method (ideally, the running time will be proportional to the sum of the side lengths of the matching area as compared to the product of the side lengths). It is, however, less capable of decoding partial areas with many uncertain or incorrectly estimated symbols.

Pattern Neighborhood Matching

As explained above, the position-coding pattern is a composition of an x encoding and a y encoding. Thus, the decoding may be handled separately for the two dimensions. FIG. 8 schematically shows a recorded partial area 800, consisting of 10×10 raster intersections and dots positioned at different displacements from the respective intersections. For each column (and each row) some of the encoded x (and y, respectively) values may be determined by identifying that a dot is located sufficiently close to one of the four possible ideal displacements—"right", "upwards", "left" or "downwards" by e.g. ⅙ of the raster cell size. For instance, dot 840 may be determined to represent displacement "left", thereby yielding (x, y)=(1, 0) according to coding legend 830. On the other hand, at some raster intersections it will not be possible to decide what a nearby dot, if any, encodes. For instance, dot 850 is located too close to its raster intersection, and at intersection 860, no dot is present at all. In these cases, neither x nor y value can be estimated. Thus, there is a need to express uncertainty about the value at a certain raster intersection, in x and/or y dimension.

By traversing the columns and rows of the recorded partial area in the above-described manner and in accordance with step 340 in FIG. 3, three characters or values "0", "1" and "-" may be used to represent the interpretation of column encodings (e.g. 820 in FIG. 8) and row encodings (e.g. 810 in FIG. 8), wherein the "-" indicates uncertainty about the dot displacement.

As already mentioned, this process results in two matrices, one for columns (x-coordinate encoding) and one for rows (y-coordinate encoding), namely the binary offset probability matrices x-BOPM and y-BOPM. An y-BOPM example is given at 1010 in FIG. 10. In a sense, the x-BOPM and y-BOPM are trinary rather than binary, since in addition to binary values they also have one value that represents uncertainty.

The x-BOPM and y-BOPM may be stored in memory 730. In more detail, each row of a matrix may be stored in a first n-bit data register (n being the size of the matrix in one dimension) that represents the "certain" values "0" and "1", and in a second n-bit data register that represents bit flags as to whether or not uncertainty applies to the corresponding value in the first n-bit data register. If a bit flag is set in the second data register, this will mean that the corresponding bit value is not to be used and that the matrix cell in question has a "-" value.

Figure 9:
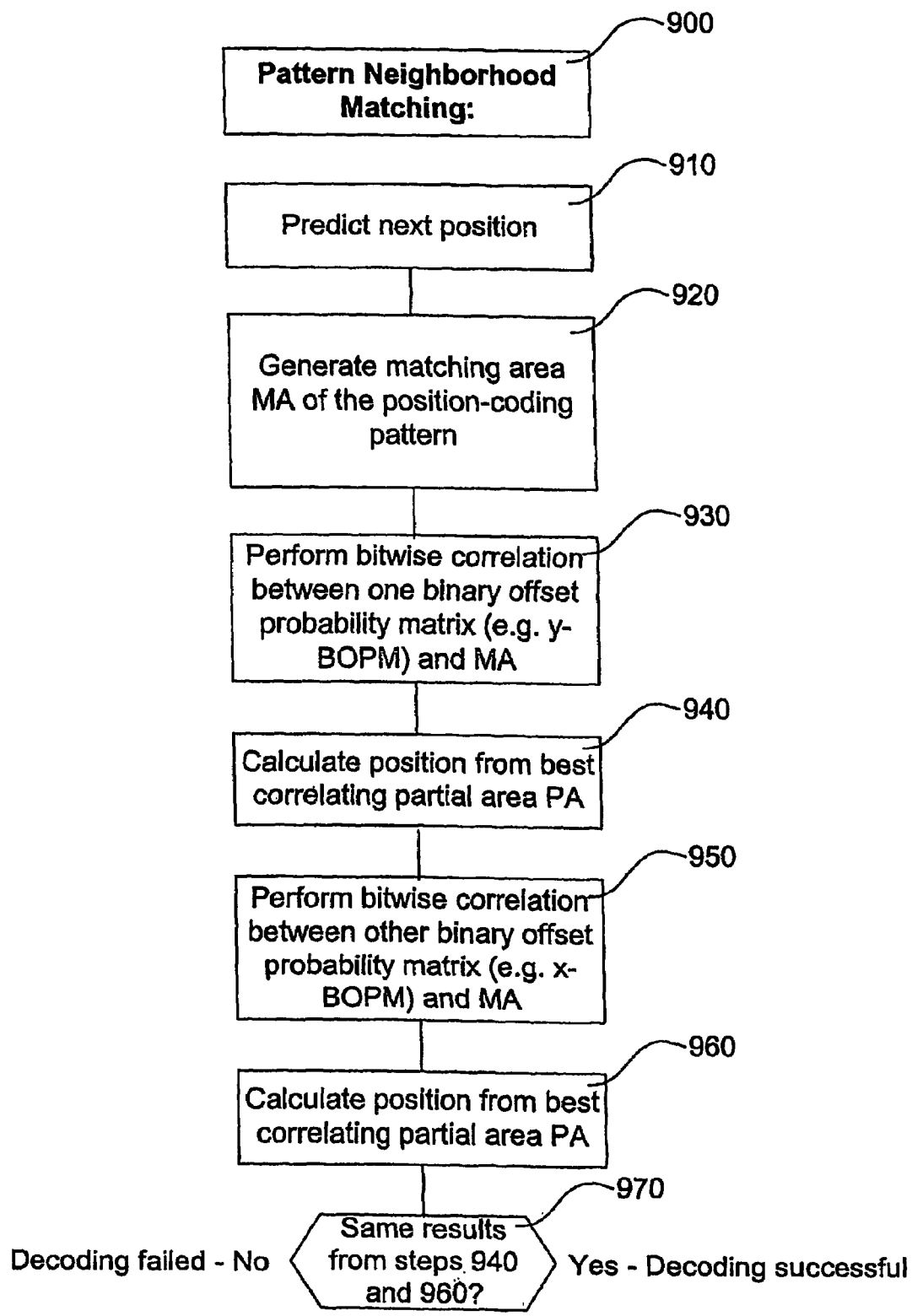
FIG. 9 is a flowchart diagram of a first embodiment of a decoding method according to the invention.

FIG. 9 illustrates the pattern neighborhood matching method 900, which implements the decoding and verifying steps 350 and 360 for this embodiment. Input data for this method is the above-mentioned two binary offset probability matrices x-BOPM and y-BOPM, as generated in step 340 of FIG. 3, as well as the two preceding positions P1 and P1' of FIG. 2.

In step 910, based on the two preceding positions P1 and P1', a next position $P2_{predicted}$ is derived by linear extrapolation from positions P1 and P1'. As an alternative, more than two preceding positions may be used for predicting the next position, wherein any known motion prediction model may be used, such as polynomial extrapolation. As yet an alternative, only one preceding position may be used, if the prediction is combined with motional data input concerning e.g. direction of movement, speed or acceleration of the user unit 2, or other useful information, such as default or predefined information on expected handwriting speed. Only one preceding position may also be used if the size of the matching area MA is set adequately large to include a following position. Such a matching area is suitably centered around the preceding position. The above alternatives may also be combined, e.g. by different numbers of preceding positions being used at different stages of the decoding process.

The or each preceding position P1, P1' may be determined in different ways. For instance, at the very beginning of a pen stroke, P1, P1' may be calculated in accordance with any prior art method, including but not limited to the ones described in aforesaid U.S. Pat. No. 6,667,695, US 2003/0012455 and U.S. Pat. No. 6,674,427, all incorporated herewith by reference. Then, as new positions have been decoded by matching in accordance with the invention, they may be used as preceding positions P1, P1' to form the basis of the prediction of a new position P2.

In step 920, the matching area MA (FIG. 2) of the position-coding pattern is generated around the predicted position. An example of a generated matching area is given at 1000 in FIG. 10. For instance, aforesaid U.S. Pat. No. 6,667,695, in column 11, line 57-column 15, line 14, and in FIG. 6 thereof, describes in detail how an area of the position-coding pattern may be generated from a given position.

In step 930, one of the binary offset probability matrices, e.g. y-BOPM, is matched with the contents of the generated matching area in the corresponding dimension, e.g. y dimension. To this end, matching unit 740 will perform bitwise correlation between the y-BOPM and each equally sized partial area of the matching area. For each such bitwise correlation, the matching unit 740 will count the number of corresponding bits in the y-BOPM and the partial area. If a bit is set to the uncertainty value "-" in the y-BOPM, this position will simply be dispensed with and no bit correspondence will of course be credited this position.

Once the y-BOPM has been matched with the entire matching area, the CPU 720 will determine the one of the partial areas for which the best match occurred with the y-BOPM (cf $PA2_{matched}$ in FIG. 2). In FIG. 10, the best matching partial area of the matching area 1000 is indicated at 1020.

In step 940, a resulting position (cf $P2_{matched}$ in FIG. 2) is calculated from the best matching partial area. This position is easily determined, since the absolute start position of the matching area MA in the position-coding pattern is already known (given by the predicted position $P2_{predicted}$). Thus, the resulting position is added as a relative position to the known absolute start position of the matching area MA so as to yield absolute-value coordinates of the predicted position.

It is to be observed that this embodiment results in a fully decoded position (both x and y coordinates) from the row pattern on y-BOPM matching. Nevertheless, by also performing x-BOPM matching with the matching area in steps 950 and 960, the result of steps 930 and 940 may be verified to gain robustness: if and only if the best correlations agree on both coordinates, the result is accepted in step 970. Thus, steps 950 and 960 may implement the verifying step 360 of FIG. 3.

As an alternative to such a separate verifying operation in steps 950 and 960, two match matrices, one for the y-BOPM matching and one for the x-BOPM matching, may be generated in parallel in steps 930 and 940. A matrix element in each of these match matrices will represent the number of matching x/y bit values for the partial area PA that starts with that matrix element's position in the matching area MA. By adding these two match matrices element by element, the CPU 720 may select the particular element position having the highest resulting sum as the matched position $P2_{matched}$ sought for. Thus, in this case a verification is inherent in the matching operation.

Alternatively or additionally to the above verification methods, the partial area(s) with the best correlation with the x-BPOM and/or the y-BOPM may only be used for position determination if a matching criterion is met. The matching criterion may include that the number of matches (i.e. bit correspondences) exceeds a predetermined threshold value and/or that the ratio of the number of matches to the number of possible matches exceeds a predetermined threshold value. The number of possible matches may be given by the number of "certain" values (i.e. not set to the uncertainty value "-") in the x-BOPM and y-BOPM, respectively.

Pattern Sequence Matching

This method makes use of the fact that positions are coded in the position-coding pattern based on two one-dimensional difference number sequences. Thus, the matching may be handled as two one-dimensional problems rather than one two-dimensional. This will mean the searching time required for matching is linear (ordo (n+m)) instead of quadratic (ordo (n*m)), n and m being the side lengths of the matching area.

Figure 13:
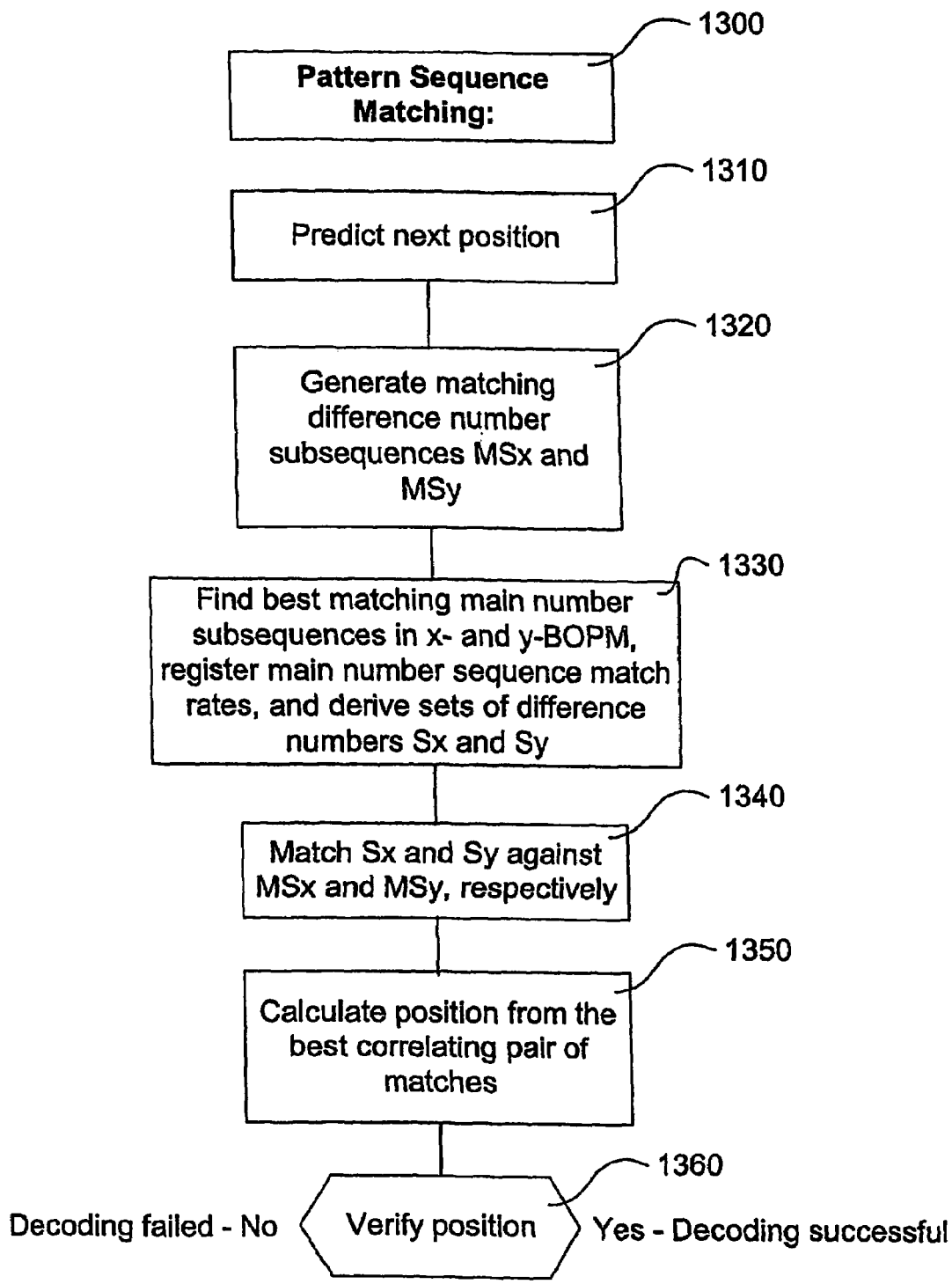

With reference to FIG. 13, the pattern sequence matching (PSM) method 1300 starts with a step 1310 of predicting the next position $P2_{predicted}$. Step 1310 may be performed in the same way as has been described above for step 910 of FIG. 9.

In a step 1320, matching difference number subsequences MSx and MSy (see 1220 in FIG. 12) are generated for a matching area MA (see 1200 in FIG. 12) around the predicted position $P2_{predicted}$. The actual matching area itself is not generated, though, in contrast to the first embodiment. Aforesaid U.S. Pat. No. 6,667,695 describes, in column 11, line 57-column 15, line 14, and in FIG. 6 thereof, how a difference number subsequence can be calculated from a given position.

A step 1330 derives sets of difference numbers Sx and Sy for the recorded partial area PA2, to be matched with the predicted matching difference number subsequences MSx and MSy produced in step 1320. First, with reference to FIG. 11, for each row/column 1110 in the y-BOPM/x-BOPM the best matching main number subsequence 1120 in the main number sequence 1100 is determined. This may be done by a fast matching algorithm, based on the fact that if six consecutive accurate bit values (i.e. having estimated values "0" or "1" but not "-") are found in the BOPM, this combination of six values will inherently have a unique position in the main number sequence. This unique main number sequence position may be obtained directly from a lookup table which is conveniently stored in memory 730 and consists of the 63 different cyclic shifts of the main number sequence 1100. The other accurate positions in the particular row/column 1110 of the y-BOPM/x-BOPM are then checked against the particular main number sequence shift from the lookup table, and if also these are found to match, then the derived main number sequence position is held to be correct. If not, a full bit-wise matching is done between the particular row/column 1110 of the y-BOPM/x-BOPM and all 63 main number sequence shifts in the lookup table, wherein the best match is selected as the derived main number sequence position for that row/column 1110. Simultaneously, a main number sequence match rate is registered in the form of the total number of matching bit values for the particular row/column 1110 of the y-BOPM/x-BOPM.

Then, step 1330 continues by deriving sets of difference numbers Sx and Sy (1230 in FIG. 12) by subtracting derived main number sequence positions for adjacent rows/columns. Also, each difference number is assigned a difference number match rate, for example by weighting (e.g. summing or averaging) the main number sequence match rates of the related rows/columns, or by selecting the minimum thereof.

Figures 11, 12:
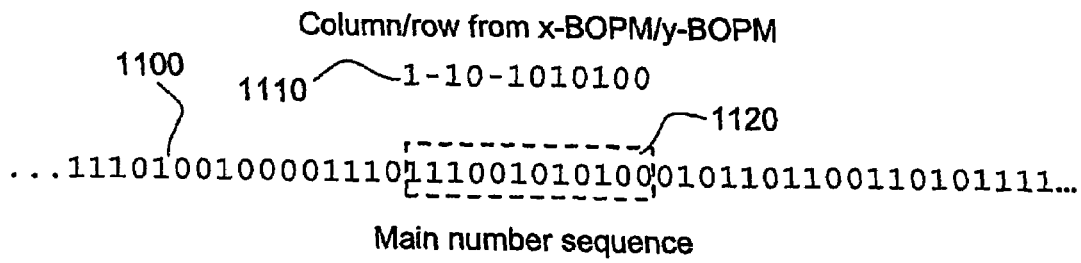
FIGS. 11, 12 and 13 are schematic illustrations to support the description of a second embodiment.

Now, in step 1340 the thus derived (i.e. observed) sets of difference numbers Sx and Sy are matched with the predicted difference number subsequences MSx and MSy, as indicated at 1220 in FIG. 12. The best match in the subsequences MSx and MSy may be selected as the respective consecutive combination of difference numbers that yields the highest number of matches, optionally further distinguished by selecting the combination thereof having the highest sum of difference number match rates. Alternatively, the best match may be selected as the combination of matching difference numbers that yields the highest sum of difference number match rates, irrespective of the number of matches.

In step 1350 the resulting position $P2_{matched}$ is determined from the resulting best match in step 1340. For reasons that are similar to the ones given in the description above for step 940 of FIG. 9, this resulting position is easily calculated.

In step 1360, the resulting position $P2_{matched}$ is verified, for instance by generating a local verifying area of the position-coding pattern around position $P2_{matched}$ and correlating this bit-wise with the x-BOPM and y-BOPM. This verification may include a matching criterion. As with the above-described Pattern Neighborhood Matching, the matching criterion may include that the number of matches (i.e. bit correspondences) should exceed a predetermined threshold value and/or that the ratio of the number of matches to the number of possible matches should exceed a predetermined threshold value. Instead of generating a complete local verifying area around position $P2_{matched}$, use may be made of the calculations performed in step 1330. Since the selected resulting position $P2_{matched}$ is the one with the best match, many of the derived difference numbers are likely to correspond with the predicted ones. The numbers of matches for the best matching main number sequences underlying these corresponding difference numbers are already known, via the above-mentioned main number sequence match rate. Thus, a local verifying area need only be generated for difference numbers which do not match.

Combination of Pattern Sequence Matching and Pattern Neighborhood Matching

Figure 14:
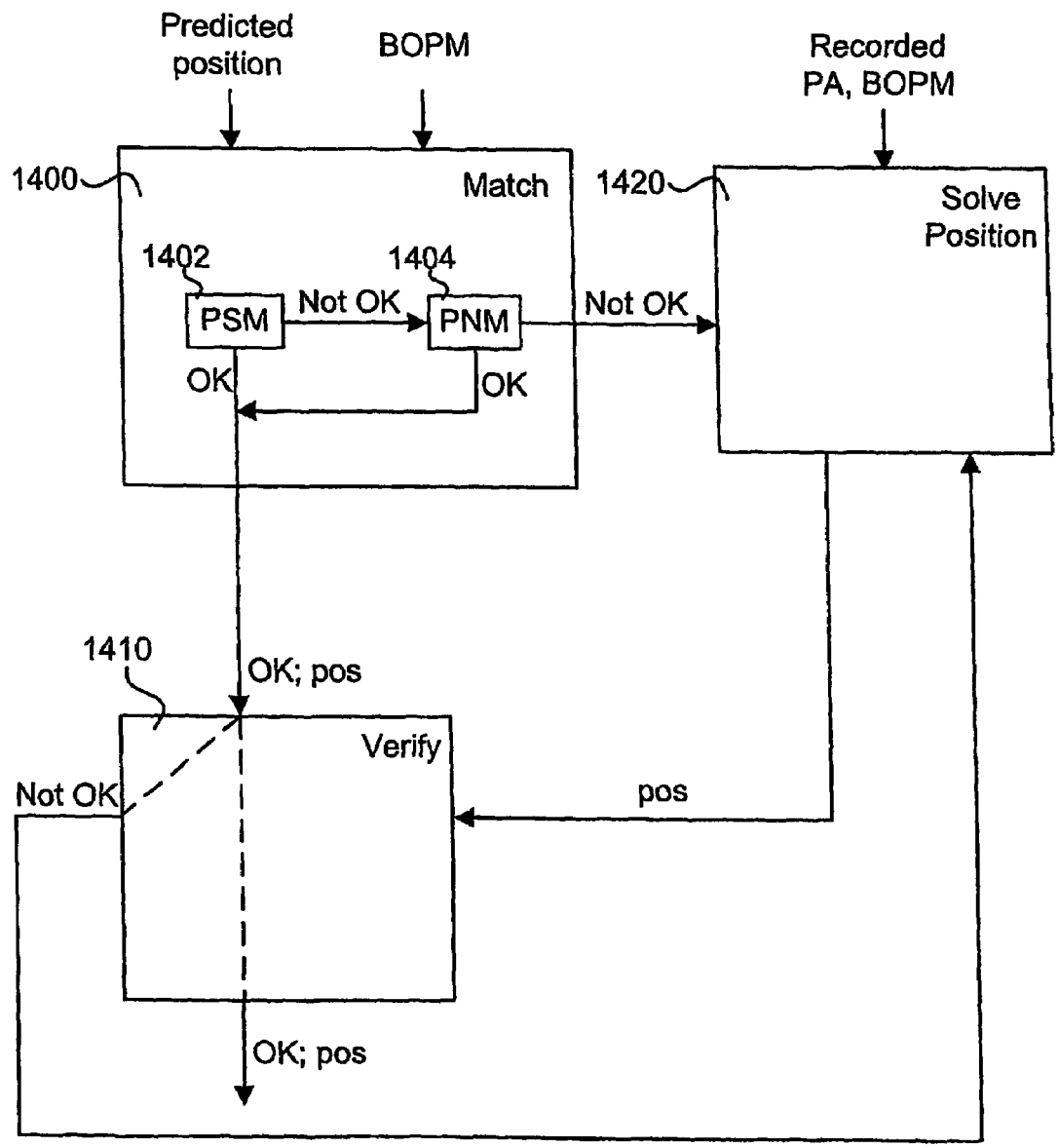
FIG. 14 illustrates an alternative embodiment, where use is made of both the first and the second embodiment.

The two embodiments may be combined, for instance as will be described with reference to FIG. 14.

As seen at 1400, matching is performed based on the generated x-BOPM and y-BOPM and the matching area information obtained through the predicted position. First, pattern sequence matching 1402 is performed. If the decoding is successful, verification is performed at 1410. If, on the other hand, the pattern sequence matching 1402 fails, then pattern neighborhood matching 1404 is performed. If this succeeds, verification follows at 1410. However, if also the pattern neighborhood matching 1404 fails, an attempt to solve the position by other, known methods is made at 1420. Such methods may involve any of the ones described in aforesaid U.S. Pat. No. 6,667,695, US 2003/0012455 and U.S. Pat. No. 6,674,427. There are situations where one could expect such methods to succeed even if the matching methods according to the invention have failed. One example is if the size of the matching area MA is too small to "catch up with" a fast-writing user. Another example is when the pen is moved over a position discontinuity in the position-coding pattern, for instance when a pen stroke is drawn from one position-coded base to another. If the position is successfully solved at 1420, the result is verified at 1410.

If verification of a result from matching 1400 fails, a further attempt may be made to solve the position at 1420. If also this attempt fails, another existing position-solving method may be tried at 1420, until all available ones have been tried.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A processor-implemented method for position decoding, in which a sequence of positions is extracted from a sequence of images, recorded by a sensor, of a position-coding pattern, said method comprising steps performed by a processor of:
   retrieving at least one reference position, the at least one reference position corresponding to a preceding position extracted from a prior image of the position-coding pattern; and
   extracting said sequence of positions by matching information obtained from each of said images with a corresponding pattern reference area, which represents a known subset of the position-coding pattern with a given spatial relation to said reference position.

2. A method as in claim 1, wherein each position in said sequence of positions is extracted by: determining a relative location, within said pattern reference area, of a match between said information and said pattern reference area; and adjusting said spatial relation by said relative location to thereby derive said position.

3. A method as in claim 1, wherein the method further comprises generating said pattern reference area for each image.

4. A method as in claim 1, wherein said spatial relation is given by a predicted position, the method comprising the step of estimating said predicted position based on said at least one reference position.

5. A method as in claim 4, wherein said pattern reference area is generated with a given positional relationship to said predicted position.

6. A method as in claim 5, wherein said predicted position is included in the known subset of the position-coding pattern.

7. A method as in claim 4, wherein said step of estimating is effected for each image, to generate a sequence of predicted positions.

8. A method as in claim 7, wherein said sequence of predicted positions are converted, by said step of extracting by matching, to said sequence of positions.

9. A method as in claim 4, wherein the predicted position is estimated based on at least two reference positions, the at least two reference positions corresponding to at least two preceding positions extracted from said sequence of images of the position-coding pattern.

10. A method as in claim 9, in which said predicted position is estimated by polynomial extrapolation of said at least two preceding positions.

11. A method as in claim 4, said sequence of images being recorded by way of an electronic handwriting tool, wherein said predicted position is estimated based on said at least one reference position and at least one of the following: a predefined direction of movement, a detected direction of movement, speed of said handwriting tool, and acceleration of said handwriting tool.

12. A method as in claim 1, in which the at least one reference position is retrieved by calculating a position based on an image of said position-coding pattern in another way than said step of extracting by matching.

13. A method as in claim 12, wherein said step of calculating a position includes at least one of: extracting symbol data from an isolated image preceding said sequence of images; deriving position data by effecting one or more lookup operations, using said symbol data, in one or more data structures that contain fundamental coding data of the position-coding pattern; and inputting said symbol or position data to a mathematical formula for explicit calculation of an absolute position.

14. A method as in claim 1, further comprising the step of merging said at least one reference position with said sequence of positions.

15. A method as in claim 1, wherein said step of retrieving is effected intermittently to update said at least one reference position.

16. A method as in claim 1, wherein, for an individual image among said sequence of images, the corresponding pattern reference area includes a plurality of partial areas defining a plurality of respective candidates to a position that is represented by the position-coding pattern in said individual image.

17. A method as in claim 16, wherein said step of extracting by matching includes comparing the information obtained from said individual image with each of said plurality of partial areas included in the corresponding pattern reference area.

18. A method as in claim 17, wherein said step of extracting by matching includes selecting, for an individual image among said sequence of images, one of said plurality of respective candidates for which the comparing step indicates correspondence between the information obtained from said individual image and one of said plurality of partial areas.

19. A method as in claim 1, wherein the position-coding pattern comprises a plurality of marks and wherein each mark codes one of at least two different values in at least one dimension.

20. A method as in claim 19, in which said step of extracting by matching includes obtaining said information from an individual image among said sequence of images by generating a probability matrix, said probability matrix representing a subarea of the position-coding pattern which is included in said individual image and containing one matrix element for each mark in said subarea, wherein each matrix element is adapted to store either a value which represents a most probable estimated value of its mark, or a value which represents that no value has been estimated for its mark.

21. A method as in claim 20, wherein said value which represents a most probable estimated value is an integer value.

22. A method as in claim 20, wherein each mark codes a binary value in a first dimension and a binary value in a second dimension, and wherein a first probability matrix is generated for the values of the marks in said first dimension and a second probability matrix is generated for the values of the marks in said second dimension.

23. A method as in claim 20, wherein the corresponding pattern reference area includes a plurality of partial areas defining a plurality of respective candidates to a position that is represented by the position-coding pattern in said individual image, wherein said step of extracting by matching includes comparing the probability matrix with each of said plurality of partial areas included in the corresponding pattern reference area.

24. A method as in claim 20, wherein the plurality of marks in the at least one dimension of the position-coding pattern being based on shifts of a cyclic main number sequence, wherein any subsequence, of a first predetermined length or longer, of said cyclic main number sequence has an unambiguously determined position in said cyclic main number sequence, and based on a sequence of difference numbers representing differences in shifts between pairs of said main number sequence in the position-coding pattern, wherein any subsequence, of a second predetermined length or longer, of said sequence of difference numbers has an unambiguously determined position in said sequence of difference numbers, said step of extracting by matching including:

obtaining a first set of difference numbers for said pattern reference area;

obtaining a second set of difference numbers from the probability matrix;

matching said second set of difference numbers with said first set of difference numbers; and extracting a position of said position-coding pattern, in said dimension, upon determination of a match in said matching step.

25. A method as in claim 24, wherein said step of obtaining a second set of difference numbers includes:

matching respective rows or columns of the probability matrix with said main number sequence so as to estimate main number sequence positions for said rows or columns; and deriving the second set of difference numbers by subtracting the estimated main number sequence positions for pairs of rows or columns of the probability matrix.

26. A method as in claim 1, wherein said sequence of positions represents at least a part of a handwriting stroke performed by way of an electronic handwriting tool.

27. A computer-readable storage medium on which is stored a computer program which, when executed in a computer, causes the computer to carry out a method according to claim 1.

28. A method as in claim 1, wherein said extracting said sequence of positions is performed solely by matching the information obtained from each of said images with the corresponding pattern reference area.

29. A processor-implemented method for position decoding by determining a position on the basis of information obtained from a partial area, recorded by a sensor, of a position-coding pattern, the position-coding pattern comprising a plurality of marks, each mark coding one of at least two different values in at least one dimension, said method comprising steps performed by a processor of:

generating a probability matrix, said probability matrix containing one matrix element for each mark in said partial area, each matrix element being adapted to store either a value which represents a most probable estimated value of its mark, or a value which represents that no value has been estimated for its mark;

matching said probability matrix with information about how the position-coding pattern is composed in a pattern reference area of said position-coding pattern, said pattern reference area being larger than said partial area and including said partial area, and said pattern reference area defining a plurality of positions; and selecting, as the position to be determined, one of the positions defined by said pattern reference area for which the matching step indicates correspondence between said probability matrix and said one of the positions defined by the pattern reference area.

30. A method as in claim 29, wherein said value of a matrix element of said probability matrix which represents a most probable estimated value is an integer value.

31. A method as in claim 29, wherein each mark codes a binary value in a first dimension and a binary value in a second dimension, and said probability matrix is formed by a first probability matrix for the values of the marks in said first dimension and a second probability matrix for the values of the marks in said second dimension.

32. A computer-readable storage medium on which is stored a computer program which, when executed in a computer, causes the computer to carry out a method according to claim 29.

33. An apparatus for position decoding, comprising a signal-processing unit which is adapted to extract a sequence of positions from a sequence of images, recorded by a sensor, of a position-coding pattern, wherein the signal-processing unit is further adapted to:

retrieve at least one reference position, the at least one reference position corresponding to a preceding position extracted from a prior image of the position-coding pattern; and extract said sequence of positions by matching information obtained from each of said images with a corresponding pattern reference area, which represents a known subset of the position-coding pattern with a given spatial relation to said reference position.

34. An apparatus as in claim 33, wherein the signal-processing unit is further adapted to extract said sequence of positions solely by matching the information obtained from each of said images with the corresponding pattern reference area.

35. An apparatus for position decoding, comprising a signal-processing unit which is adapted to determine a position on the basis of information obtained from a partial area, as recorded by a sensor, of a position-coding pattern, the position-coding pattern comprising a plurality of marks, each mark coding one of at least two different values in at least one dimension, wherein the signal-processing unit is further adapted to:

generate a probability matrix, said probability matrix containing one matrix element for each mark in said partial area, each matrix element being adapted to store either a value which represents a most probable estimated value of its mark, or a value which represents that no value has been estimated for its mark;

match said probability matrix with information about how the position-coding pattern is composed in a pattern reference area of said position-coding pattern, said pattern reference area being larger than said partial area and including said partial area; and select, as the position to be determined, the one of the positions defined by said pattern reference area for which the matching step indicates correspondence between said probability matrix and said pattern reference area.

* * * * *